US011467964B1

(12) United States Patent
Lakshminarayana et al.

(10) Patent No.: US 11,467,964 B1
(45) Date of Patent: Oct. 11, 2022

(54) MERGEABLE COUNTER SYSTEM AND METHOD

(71) Applicant: Marvell Asia Pte, Ltd. (Registration No. 199702379M), Singapore (SG)

(72) Inventors: Nagesh Bangalore Lakshminarayana, San Jose, CA (US); Pranith Kumar Denthumdas, Mountain View, CA (US); Rabin Sugumar, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/008,574

(22) Filed: Aug. 31, 2020

Related U.S. Application Data

(60) Provisional application No. 62/987,219, filed on Mar. 9, 2020.

(51) Int. Cl.
*G06F 12/08* (2016.01)
*G06F 12/0831* (2016.01)
*G06F 12/0808* (2016.01)
*G06F 9/32* (2018.01)
*G06F 11/07* (2006.01)
*G06F 12/0817* (2016.01)

(52) U.S. Cl.
CPC .......... *G06F 12/0833* (2013.01); *G06F 9/321* (2013.01); *G06F 11/076* (2013.01); *G06F 12/082* (2013.01); *G06F 12/0808* (2013.01); *G06F 2212/62* (2013.01)

(58) Field of Classification Search
CPC ............. G06F 12/0833; G06F 12/0808; G06F 12/082; G06F 9/321; G06F 11/076
See application file for complete search history.

(56) References Cited

U.S. PATENT DOCUMENTS

| 2007/0214321 A1* | 9/2007 | Shannon ............... G06F 12/123 711/E12.072 |
| 2009/0077571 A1* | 3/2009 | Gara ..................... G06F 11/348 719/318 |
| 2014/0282616 A1* | 9/2014 | Frazier ................. G06F 11/348 719/318 |
| 2014/0310468 A1 | 10/2014 | Speier et al. |
| 2015/0207511 A1* | 7/2015 | Dahan .................. H03K 23/542 377/34 |
| 2015/0254155 A1* | 9/2015 | Agarwala ........... G06F 11/3632 714/45 |
| 2018/0349280 A1* | 12/2018 | Prasad .................. G06F 12/128 |
| 2019/0042795 A1* | 2/2019 | Bolotov ................ H04L 9/0891 |
| 2019/0180113 A1* | 6/2019 | Harris .................. H04N 5/3696 |
| 2021/0224042 A1* | 7/2021 | Sandberg ............. H04L 9/3242 |

FOREIGN PATENT DOCUMENTS

EP            1113249 A2 *  7/2001  ......... G01G 23/3707

* cited by examiner

*Primary Examiner* — Pierre Michel Bataille

(57) ABSTRACT

A system includes a first counter configured to increment or decrement in response to a triggering event. The first counter is sized to overflow. The system also includes a second counter configured to increment or decrement in response to a triggering event. The first counter and the second counter are merged to form a third counter in response to detecting an overflow triggering event for the first counter. A merge bit indicative of whether the first counter and the second counter are merged changes value in response to merging the first counter and the second counter.

22 Claims, 5 Drawing Sheets

MERGEABLE COUNTER SYSTEM AND METHOD

CROSS-REFERENCE TO RELATED APPLICATIONS

This application claims the benefit and priority to the U.S. Provisional Patent Application No. 62/987,219, filed Mar. 9, 2020, which is incorporated herein in its entirety by reference.

BACKGROUND

Counters to increment/decrement have become ubiquitous in many systems. For example, in a multi-core system counters may be used by snoop filters in a cache coherency protocol to keep track of cache lines cached in the multi-core system. In general, the counters are sized for the worst case scenario so that overflow does not occur. Unfortunately, sizing the counters for the worst case scenario leads to inefficiencies in the system even though the worst case (e.g., overflow) may rarely occur. Inefficiencies include real estate inefficiencies as well as power inefficiencies resulting from sizing the counters (larger than may be necessary) for the worst case scenario.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
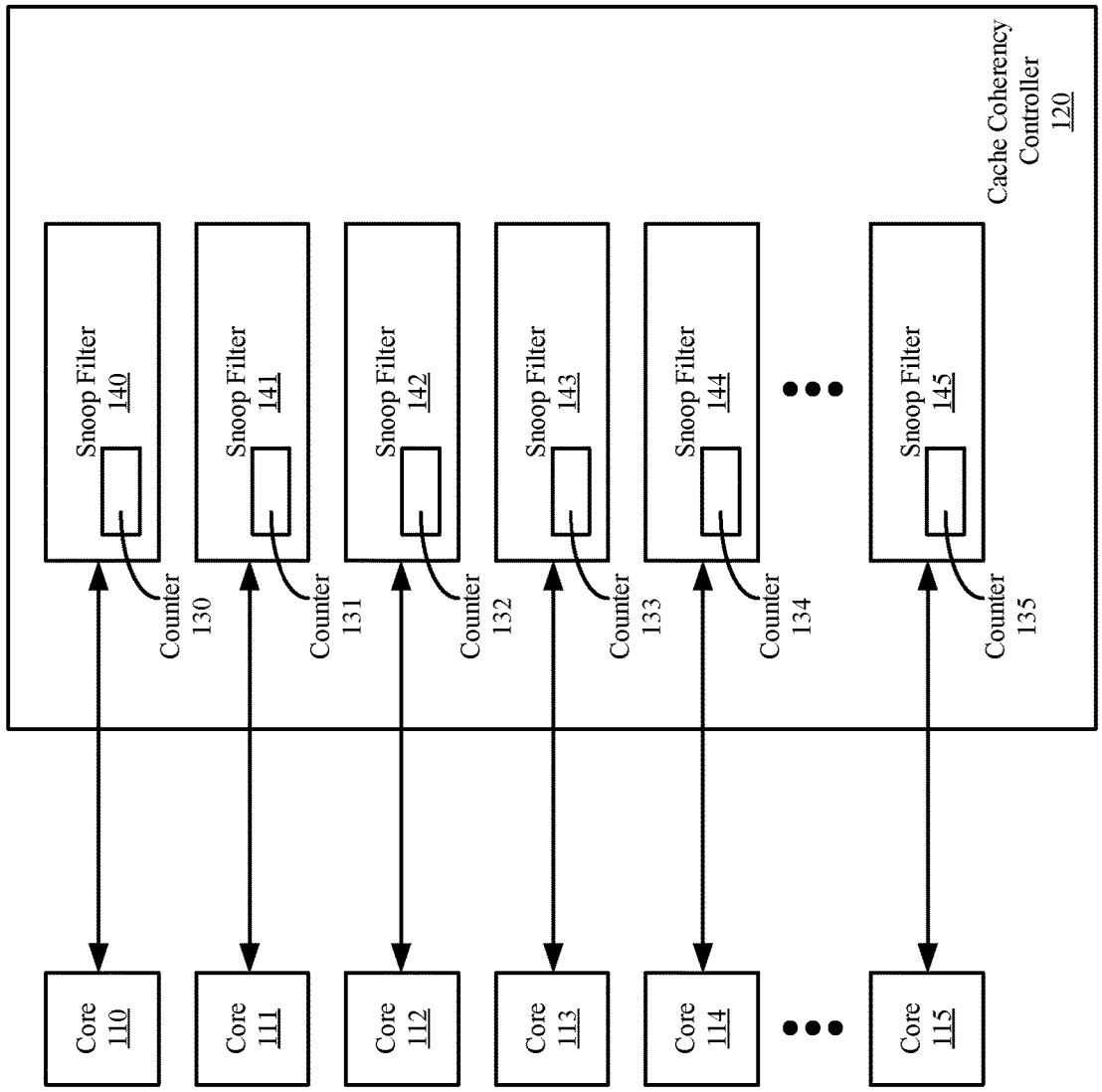
FIG. 1 depicts an example of a diagram of a hardware-based architecture utilizing merging of counters to prevent overflow according to an aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts and the terminology is not intended to be limiting. Unless defined otherwise, all technical and scientific terms used herein have the same meaning as commonly understood in the art to which the embodiments pertain.

A new approach of systems and methods to merge counters and to unmerge the merged counter, as needed, is disclosed. It is appreciated that the embodiments and the operation of the counters merging and unmerging are described with respect to a multi-core system with a cache coherency protocol for illustrative purposes and should not be construed as limiting the scope of the embodiments. To the contrary, the merging and unmerging of counters may be used in any system and it is not limited to a cache coherency protocol.

In a multi-core system, a snoop-based cache coherence protocol may be used to determine whether any of the cores have a cache-line requested by a requesting core (if the requesting core has a miss in its private cache for the requested cache-line) in their cache, e.g., private cache. It is appreciated that the embodiments are described with respect to each core having its own cache for illustrative purposes and should not be construed as limiting the embodiments. For a non-limiting example, each core may not have its own private cache and more than one core may share a cache. A snoop filter may be used to reduce the number of snoop requests and other messages that are sent out on the on-chip network, thereby reducing latency, on-chip network traffic, and energy consumption. A snoop filter may be implemented at a source core having a miss, at a destination core receiving a snoop request, or at a different location such as a coherence controller. A snoop filter may track the cores having copies of cache lines and may be implemented as a table of counters. It is appreciated that the more accurate the snoop filter is, the fewer coherence messages are sent, however, this requires more storage and as a result more resource cost. In some embodiments, a hashing function may be used to map cache lines to a table index and a counter is used that is incremented when a core caches a line that maps to the index and is decremented when a line that maps to the index is evicted from the core's last private cache. Traditionally the counters were sized for the worst case scenario and were therefore large enough to prevent overflow. However, since the worst case, e.g., overflow, rarely occurs, according to some embodiments the counters may be sized smaller to account for the majority of the cases and two or more counters are merged when it is detected that overflow of the smaller sized counter may occur. Under the proposed approach, merging of the counters increases the size of the counter when needed such that overflow does not occur with the penalties associated with the conventional systems where the counters were designed for the worst case scenario. In other words, mergeable/fusible counters are used to form a larger counter when needed. The value of the larger merged counter is the addition of the two mergeable/fusible counters plus 1 if the counter is expected to be incremented. The merged larger counter may subsequently be demerged into its original mergeable/fusible counters when the larger counter is no longer needed.

FIG. 1 depicts an example of a diagram of a hardware-based architecture utilizing merging of counters to prevent overflow according to an aspect of the present embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, an architecture includes cores 110-115 interacting with a cache coherency controller 120. The cache coherency controller 120 may include snoop filters 140-145 each with its respective counters 130-135. The cache coherency controller 120 is configured to maintain coherency among different cores, e.g., cores 110-115. Each of these components in the architecture is a dedicated hardware block/component programmable by a user at a host (not shown) via software instructions for various operations. When the software instructions are executed, each of the hardware components becomes a special purposed hardware component for practicing certain machine learning functions. In some embodiments, the architecture 100 is on a single chip, e.g., a system-on-chip (SOC).

In the example of FIG. 1, the architecture illustrates a per-core snoop filter where each core has its associated snoop filter. For example, core 110 is associated with the snoop filter 140 and its counter 130. It is appreciated that references to the counter 130 as a single counter is for illustrative purposes and should not be construed as limiting the scope of the embodiments. For example, the snoop filter 140 may include two or more counters in some nonlimiting examples. Core 111 is associated with the snoop filter 141 and its counter 131. Core 112 is associated with the snoop filter 142 and its counter 132. Core 113 is associated with the snoop filter 143 and its counter 133. Core 114 is associated with the snoop filter 144 and its counter 134. Core 115 is associated with the snoop filter 145 and its counter 135. It is appreciated that although a per-core snoop filter is used as a nonlimiting example in the discussions below, any number of cores and snoop filters may be used and the number of cores/snoop filters shown are for illustrative purposes and should not be construed as limiting the scope of the embodiments.

In the example of FIG. 1, each core in the per-core snoop filter architecture is associated with its respective counter where the counter is being updated by that core alone. For nonlimiting example, core 110 is associated with counter 130 and controls whether counter 130 should be incremented or decremented. Similarly, core 111 is associated with counter 131 and controls whether counter 131 should be incremented or decremented. Core 112 is associated with counter 132 and controls whether counter 132 should be incremented or decremented. Core 113 is associated with counter 133 and controls whether counter 133 should be incremented or decremented. Core 114 is associated with counter 134 and controls whether counter 134 should be incremented or decremented. Core 115 is associated with counter 135 and controls whether counter 135 should be incremented or decremented. In some embodiments, each counter may be incremented/decremented in response to a triggering event.

It is appreciated that a per-core snoop filter is organized as one snoop filter entry per table index and a snoop entry has one or more counter per core. A hashing function may be used to map cache lines to a table index in the per-core snoop filter. It is appreciated that a triggering event may be when a core caches a line that maps to the index and the counter is incremented. In contrast, a triggering event may be when a line that maps to the index is evicted from the core's last private cache and the counter is decremented.

It is appreciated that instead of sizing each counter for the worst case scenario to prevent counter overflow that may rarely occur, each counter or a subset of the counters may be sized such that overflow is possible. However, a processor for example, upon receiving an overflow triggering event, i.e. detecting that overflow may occur or is imminent, one counter may be merged with another counter to form a larger counter. In other words, the merging of the counters increases the size of the counter when needed such that overflow does not occur without the penalties associated with the conventional systems where the counters were designed for the worst case scenario.

For illustrative purposes and as a nonlimiting example, it is presumed that each per-core counter is required to count up to 46, which may be a function of number of rows/indices in the snoop filter, the hashing function used, cache design, etc. For a nonlimiting example, counters 130-135 may be each required to count up to 46, which requires a 6-bit wide counter. However, instead of sizing each of the counters to be 6-bit wide so that overflow does not occur, counters 130-135 may be sized smaller but mergeable/fusible when needed to be combined with other counters to form a larger counter to prevent overflow from occurring. It is appreciated that counters 130-135 are sized such that a merged counter counts up to at least twice the number a full-sized counter is required to count, e.g., in this example 2*46=92. In this example, instead of using a 6-bit wide counter, a 4-bit wide counter may be used such that when merged it is 8-bit wide and can count up to 255.

In some embodiments, counters 130-135 may each be 4-bit wide instead of 6 bits and any two or more counter may be merged by a processor, such as a cache coherency controller 120, to form a larger counter when needed, e.g., when an overflow triggering event is received, to prevent overflow. In some embodiments, a mergeable bit is used to indicate whether two counters have been merged or not. In this example using a 4-bit wide counter results in significant savings, e.g., 2*6−(2*4+1)=3-bits, or 1.5-bits per 6-bit counter or 25% saving in bits. It is appreciated that across multiple snoop filter instances each with large number of entries and cores, the saving in area and power becomes substantial.

It is appreciated that the discussion of each counter counting up to the same number and each counter being sized the same is for illustrative purposes and should not be construed as limiting the scope of the embodiments. For a nonlimiting example, certain counters may be required to count up to a particular value whereas other counters may have a different value and further the counters may be sized differently. For example, counter 130 may be required to count up to a different value from that of counter 131 and as such each of them may be sized differently.

In some embodiments, the counter 130 increments/decrements in response to a triggering event. Similarly, other counters, e.g., counters 131-135 operate substantially the same. It is appreciated that once a counter reaches a certain overflow threshold value, an overflow triggering event may be generated. For a nonlimiting example, when the counter 130 that is 4-bit wide reaches a binary value 1111 (overflow threshold value), the overflow triggering event may be generated to indicate that counter 130 will overflow with the next increment prior to a decrement signal. It is appreciated that the binary value 1111 used for overflow threshold value, which is the maximum value for counter 130 is provided as an example and should not be construed as limiting the scope of the embodiments. For example, the overflow threshold value may be 1110 or any other value close to the counter reaching its maximum count value.

It is appreciated that if counter 130 reaches the overflow threshold value, then the overflow triggering event may be generated to indicate that the counter 130 may overflow. As such, the counter 130 may be merged with another counter to form a larger counter. In this example, the counter 130 is merged with counter 131 to form another counter that is 8-bit wide (each counter being 4-bit wide originally). When counters 130 and 131 are merged to form an 8-bit wide counter, a mergeable bit may change value, e.g., asserted, indicating that two counters have been merged. Once the merged counter is formed, the content of the merged counter becomes the addition or sum of the original count of counter 130 and the count of counter 131. If an increment event occurs, then the addition of counters 130 and 131 is incremented by 1 and stored in the newly formed 8-bit counter. It is appreciated that once the larger counter is formed, the newly formed counter is controlled by both cores, e.g., cores 110 and 111, as opposed to the original design where each counter was being controlled by its own core alone. The newly formed counter increment/decrement in response to each of the cores 110 and 111.

It is appreciated that a similar process may occur to demerge the newly formed 8-bit counter into two 4-bit counters. For example, after the 8-bit counter is formed, a series of decrementing may occur to bring the count of the 8-bit counter to a particular threshold value, e.g., 0000. In response to the 8-bit counter reaching a particular threshold value that is smaller than the maximum count value for a 4-bit counter, the 8-bit counter may demerge into two 4-bit counters. In other words, the counters 130 and 131, each being 4-bit wide, are restored. It is appreciated that the mergeable bit changes value, e.g., de-asserted, to indicate that the counter has demerged.

It is appreciated that the embodiments discussed above were described with respect to two counters of the same size merging/demerging for illustrative purposes. However, it is appreciated that counter of any size may be merged/demerged. For a nonlimiting example, counter 130 may be a 4-bit wide counter and counter 131 may be a 3-bit wide counter and they may be merged to form a 7-bit wide counter in some embodiments. Moreover, it is appreciated that once an 8-bit wide counter is formed, as originally described, other counters may be merged/demerged, e.g., an 8-bit wide counter may be merged with a 4-bit wide counter 132. It is further appreciated that the merging of counters may be programmed in advance, e.g., counters 130 and 131 to be merged if needed, counters 132 and 133 to be merged, etc., or they may be merged as needed on the fly based on heuristics without being programmed in advance, e.g., counter 130 to be merged with a counter having a small count value such as counter 135.

Figure 2A:
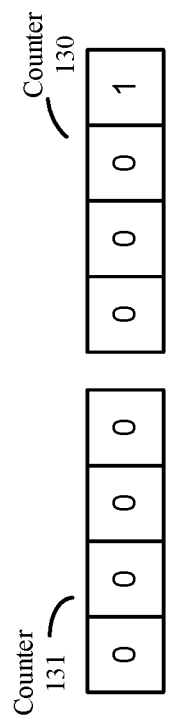
FIGS. 2A-2H depict nonlimiting examples for merging counters to prevent overflow according to an aspect of the present embodiments.
Figure 2B:
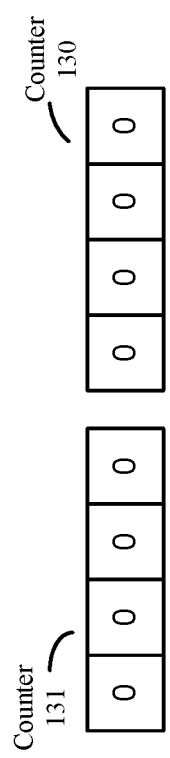
Figure 2C:
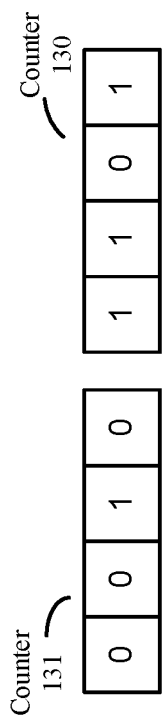
Figure 2D:
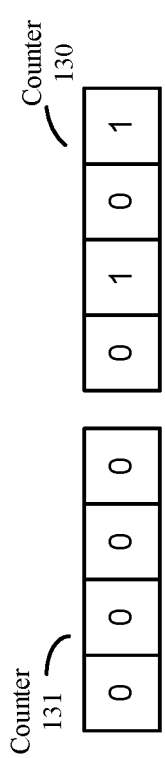
Figure 2E:
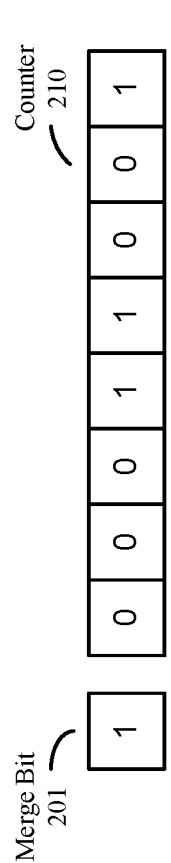
Figure 2F:
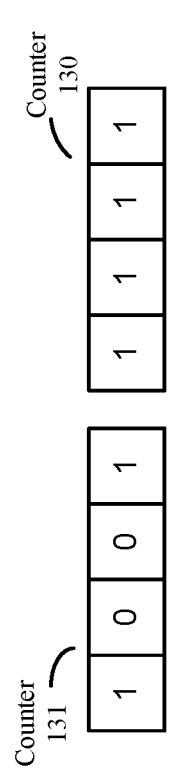
Figure 2G:
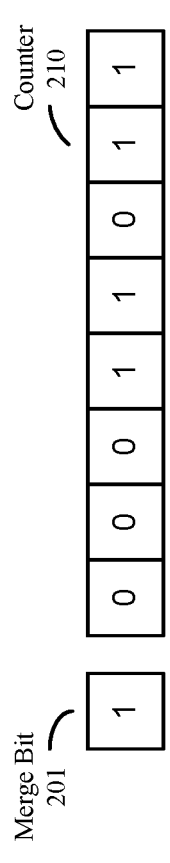
Figure 2H:
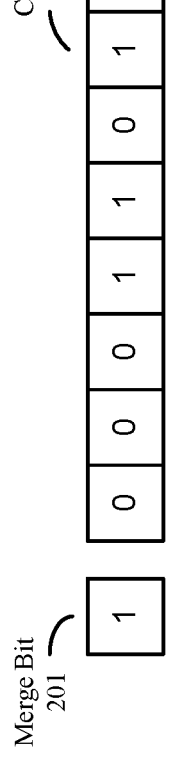

FIGS. 2A-2H depict nonlimiting examples for merging counters to prevent overflow according to an aspect of the present embodiments. The merging of the counters are described with respect to counters 130 and 131 for illustrative purposes but it is appreciated it is applicable to any of the counters. In this nonlimiting example, in FIG. 2A, counters 130 and 131 each hold a 0000 value. The counter 130 is controlled by the core 110 whereas counter 131 is controlled by core 111. In FIG. 2B, the counter 130 is incremented by 1 in response to a triggering event from the core 110 and as such the count value is updated to 0001. In FIG. 2C, some time has elapsed and the core 110 has further incremented/decremented the counter 130 but the net result is value 0101. At a later time, in FIG. 2D, core 111 has incremented the counter 131 to 0010 whereas the core 110 has incremented the counter 130 to 1101. Referring now to FIG. 2E, the core 110 controls and increments the counter 130 to value 1111 and the counter 131 is incremented to 1001 by the core 111. It is appreciated that in some nonlimiting examples, the overflow triggering event is when the content of a counter reaches a particular value and threshold, e.g., 1111 in this example. As such, the overflow triggering event is generated to indicate that counter 130 may overflow soon or that overflow may be imminent. Accordingly, counters 130 and 131 are merged to form a new counter 210 that is 8-bit wide, as shown in FIG. 2F. The merge bit 201 may change value, e.g., be asserted, to indicate that two counters have been merged. It is appreciated that when the two counters are merged an increment triggering event may be received from either cores 110 or 111. As such, the content of the newly formed counter 210 becomes the addition of the content of counters 130 and 131 plus 1 to increment, resulting in 00011001. According to some nonlimiting examples, the newly formed counter 210 is now controlled by the cores 110 and 111. For example, the counter 210 may be incremented in response to a triggering event from either of the cores 110 or 111, and the counter 210 may be decremented in response to a triggering event from either of the cores 110 or 111. Referring now to FIG. 2G, the counter 210 is incremented by 1 in response to a triggering event from the cores 110 or 111 and therefore the count value is updated to 00011010. It is appreciated that the merge bit 201 value remains the same, e.g., asserted. Referring now to FIG. 2H, the counter is incremented by 1 in response to a triggering event from the cores 110 or 111 and therefore the count value is updated to 00011010. It is appreciated that the merge bit 201 value remains the same, e.g., asserted. It is appreciated that incrementing of counter 210 is shown for illustrative purposes and should not be construed as limiting the scope of the embodiments. For example, the counter 210 may similarly be decremented in response to triggering events from the cores 110 or 111. It is appreciated that while the counter 210 is formed other counters 132-135 may remain as a 4-bit wide counter or may similarly be merged as needed similar to counters 130-131.

Figure 3A:
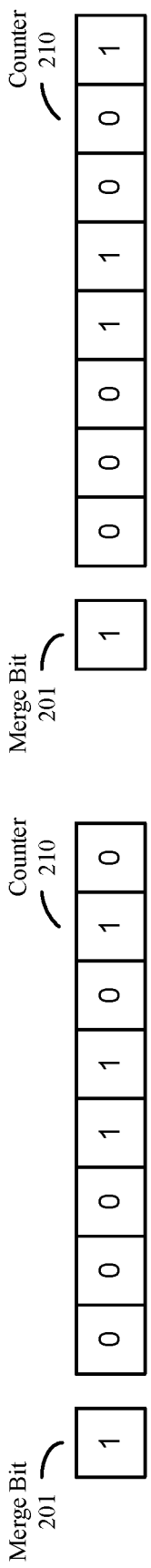
FIGS. 3A-3H depict nonlimiting examples for demerging a counter according to an aspect of the present embodiments.
Figure 3B:
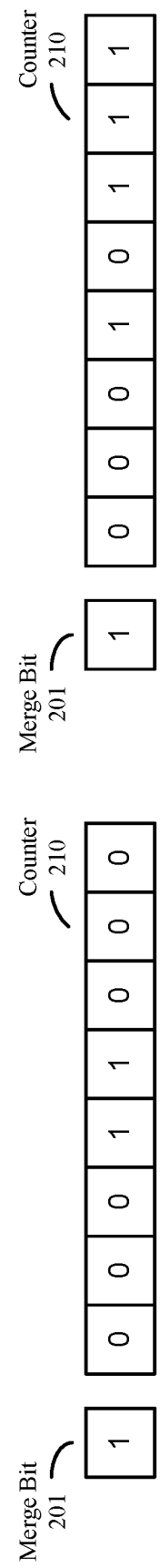
Figure 3C:
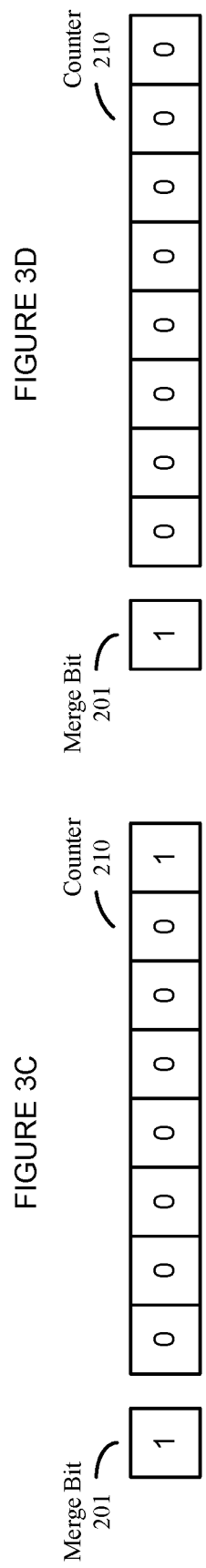
Figure 3D:
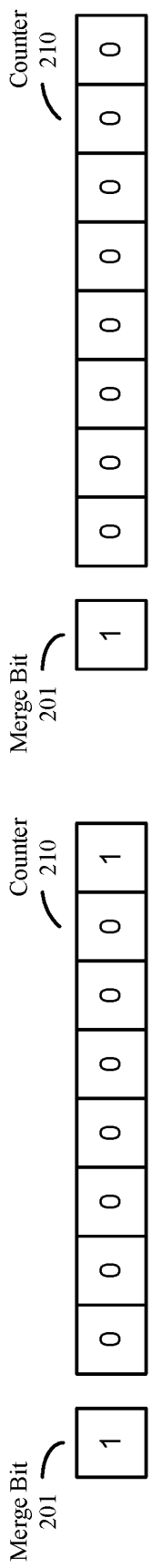
Figure 3E:
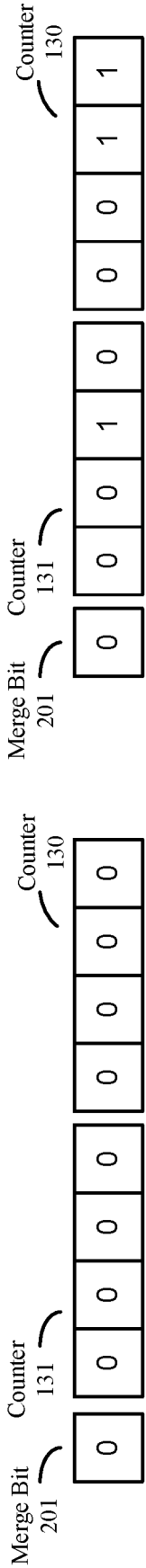
Figure 3F:
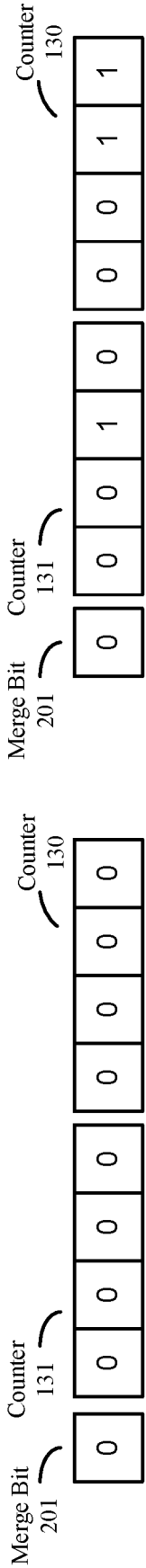
Figure 3G:
Figure 3H:
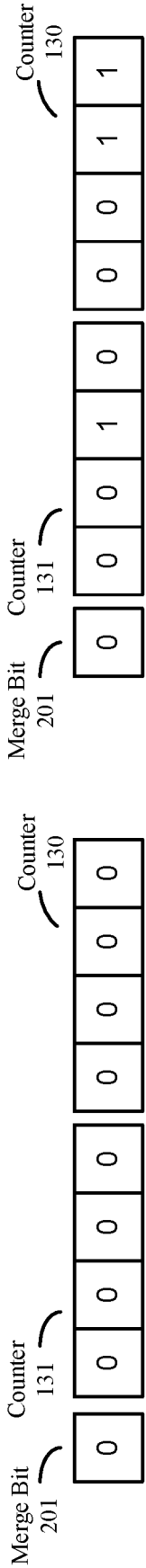

FIGS. 3A-3H depict nonlimiting examples for demerging a counter according to an aspect of the present embodiments. Referring to FIG. 3A, the counter 210 is shown having a value 00011010 after a series of increments/decrements by cores 110 and 111. Referring now to FIG. 3B, the value of counter 210 is decremented in response to a triggering event, e.g., from core 110 or core 111, resulting in 00011001 value. It is appreciated that a similar process continues as shown in FIGS. 3C-3F resulting in values 00011000, 00010111, 00000001, and 00000000, respectively. It is appreciated that in some nonlimiting examples, the threshold value that once reached to demerge the counter may be 00000000. Since the counter 210 reaches the threshold value of 00000000, it is demerged into counters 130 and 131 each being 4-bit wide and the mergeable bit value changes value, e.g., de-asserted, as illustrated in FIG. 3G. The count value for counter 130 is 0000 and the count value for counter 131 is 0000. It is appreciated that once the counter 210 is demerged into counters 130 and 131, the operation of each of the counters 130 and 131 is controlled by its respective core alone. For example, the counter 130 is controlled by core 110 and the counter 131 is controlled by core 111 after the counter 210 is demerged. Referring now to FIG. 3H, the counters 130 and 131 are each incremented/decremented based on triggering events as controlled by their respective cores 110 and 111. The value of the counters 130 and 131, 0010 and 0011 respectively, reflects the incrementing and/or decrementing by its respective core. It is appreciated that the counters 130 and 131 are therefore restored. However, it is appreciated that should an overflow triggering event occur for either of the counters, a merging operation may be initiated again. It is appreciated that subsequent merging operation may be with the same counter or with a different counter, e.g., between counters 130 and 133 as an example.

Figure 4:
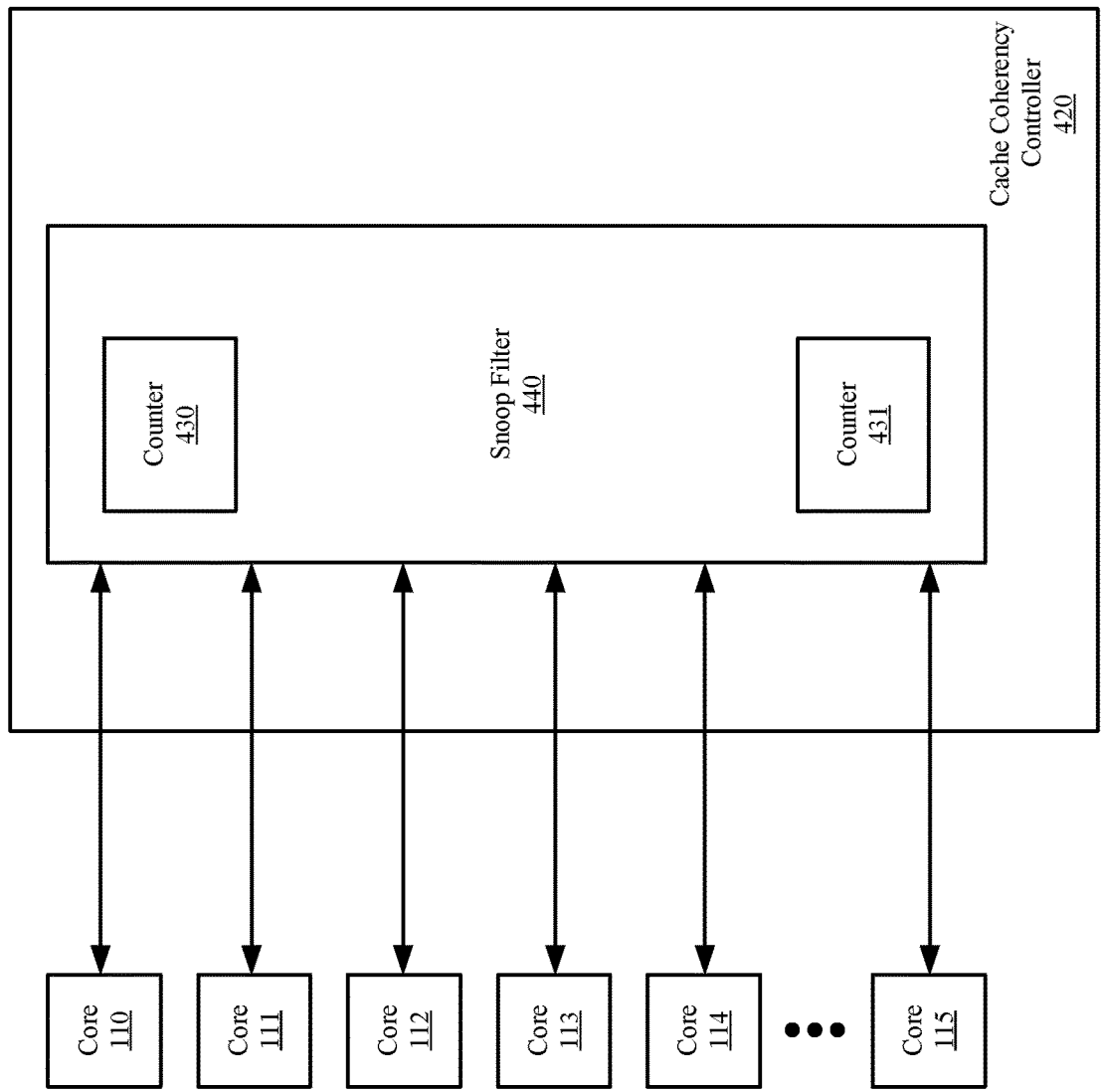
FIG. 4 depicts another example of diagram of a hardware-based architecture utilizing merging of counters to prevent overflow according to an aspect of the present embodiments.

FIG. 4 depicts another nonlimiting example of diagram of a hardware-based architecture utilizing merging of counters to prevent overflow according to an aspect of the present embodiments. FIG. 4 is substantially similar to that of FIG. 1 except that instead of a per-core snoop filter where each counter is controlled by its own core, an aggregate snoop filter 440 in the cache coherency controller 420 is used where the counter 430 for the snoop filter is being controlled by cores 110-115. For example, a triggering event by any of the cores 110-115 controls incrementing/decrementing of the counter 430. In this nonlimiting and illustrative example, the counter 430 may be a 4-bit wide counter, similar to FIG. 1. In response to overflow triggering event, e.g., the counter 430 reaches a threshold value of 1111 or 1110 or 1101, etc., the counter 430 may be merged with another counter 431 to form a larger counter, as described above. It is appreciated that the merged counter may be demerged similarly when the merged counter reaches a threshold value, e.g., 00000000, as described above.

Figure 5:
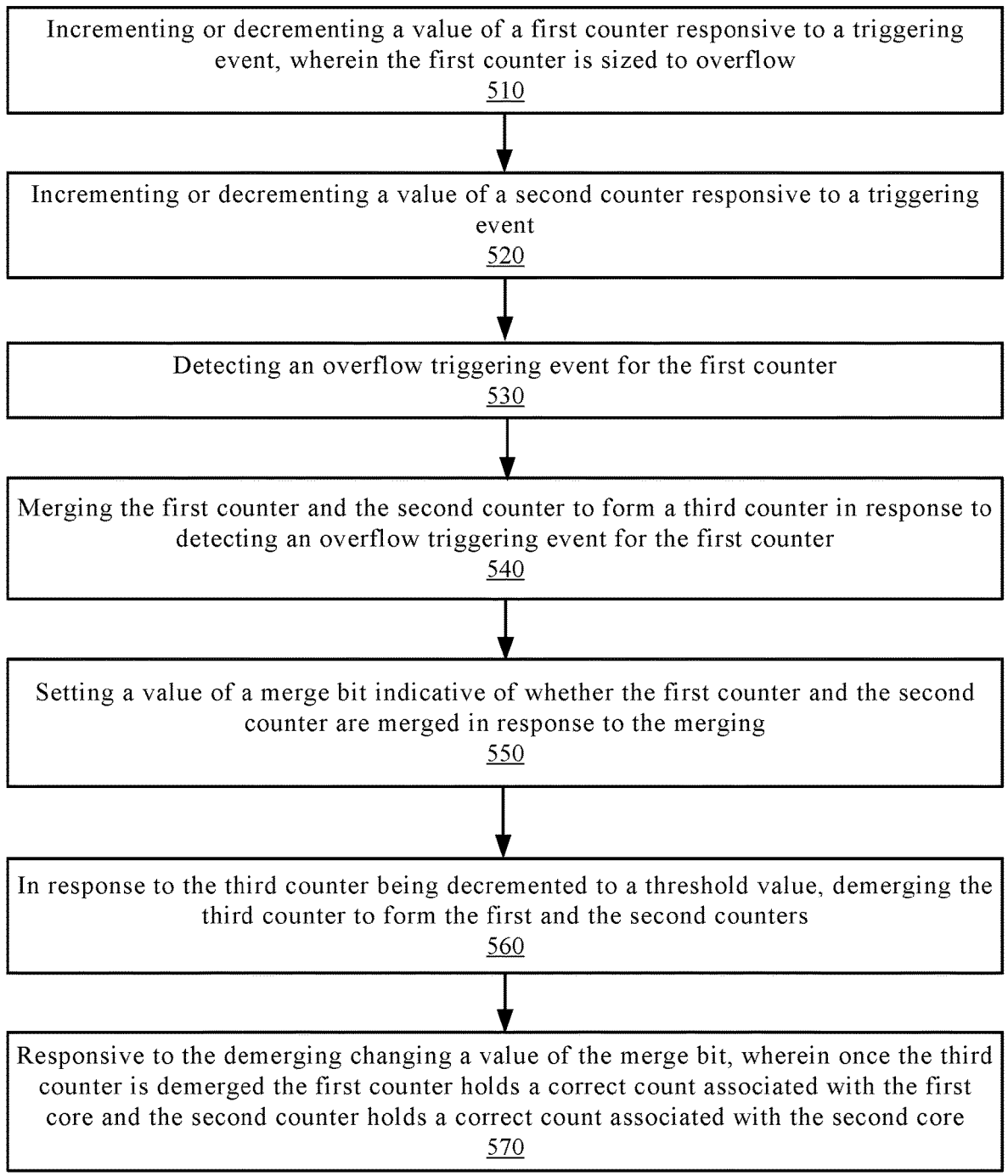
FIG. 5 depicts a flowchart of an example of a process for merging/demerging counters according to an aspect of the present embodiments.

FIG. 5 depicts a flowchart of an example of a process for merging/demerging counters according to an aspect of the present embodiments. At step 510, a value of a first counter is incremented/decremented based on a triggering event, as described above in FIGS. 1-4. It is appreciated that the first counter may be sized to overflow. At step 520, a value of a second counter is incremented/decremented based on a triggering event, as described above in FIGS. 1-4. It is appreciated that in some embodiments, the second counter may be sized to overflow. At step 530, an overflow triggering event for the first counter is detected. At step 540, the first counter and the second counter may be merged to formed a third counter in response to detecting that an overflow event, e.g., first counter reaching a certain value, first counter about to overflow or overflow is imminent, etc., for the first counter has occurred, as described above in FIGS. 1-4. The third counter is larger than the first counter and the second counter. The size of the third counter may be the sum of bit-width of the first and the second counters combines. Once the two counters are merged, at step 550, a value of the mergeable bit is set, e.g., asserted, to indicate that the counters have merged, as described above in FIGS. 1-4. At step 560, the third counter is decremented to a threshold value, e.g., 00000000, as described above in FIGS. 1-4, and demerged to form the first and the second counters. In other words, the first and the second counters are restored. The values of the first counter and the second counter, e.g., 0000, are determined from the value of the third counter. It is appreciated that at step 570, once the third counter is demerged to the first counter and the second counter, the value of the mergeable bit changes value, e.g., de-asserted, as described above in FIGS. 1-4. It is appreciated that the value count for the first counter reflects the correct count associated with the first core and the value count for the second counter reflects the correct count associated with the second core. Moreover, it is appreciated that the first counter and the second counter are each controlled by their respective core again instead of being controlled by both cores.

Accordingly, it is appreciated that instead of sizing each counter for the worst case scenario to prevent counter overflow that may rarely occur, each counter or a subset of the counters may be sized such that overflow is possible. However, upon receiving an overflow triggering event, i.e. detecting that overflow may occur or is imminent, one counter may be merged with another counter to form a larger counter. In other words, the merging of the counters increases the size of the counter when needed such that overflow does not occur without the penalties associated with the conventional systems where the counters were designed for the worst case scenario. It is appreciated that reducing the counter size, as described above, results in significant cost savings, e.g., real estate, power, etc.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A method comprising:
    incrementing or decrementing a value of a first counter responsive to a triggering event, wherein the first counter is configured to a first size and allows overflow;
    incrementing or decrementing a value of a second counter responsive to a triggering event;
    detecting an overflow triggering event for the first counter;
    merging the first counter and the second counter to form a third counter in response the overflow triggering event for the first counter; and
    setting a value of a merge bit indicative of whether the first counter and the second counter are merged in response to the merging,
    wherein prior to detecting the overflow triggering event causing the first counter to merge with the second counter, the increment or decrement of the first counter occurs independent of the increment or decrement of the second counter.

2. The method of claim 1, wherein the second counter is configured to a second size and allows overflow.

3. The method of claim 1, wherein the overflow triggering event is when the first counter reaches an overflow threshold value.

4. The method of claim 1, wherein the overflow threshold value is when the first counter reaches a maximum value for a size of the first counter.

5. The method of claim 1, wherein the first counter is controlled by a first core and the second counter is controlled by a second core, and wherein the third counter once formed is controlled by the first core and the second core.

6. The method of claim 1 further comprising:
in response to the third counter being decremented to a threshold value, demerging the third counter to form the first and the second counters; and
responsive to the demerging changing a value of the merge bit, wherein once the third counter is demerged the first counter holds a correct count associated with the first core and the second counter holds a correct count associated with the second core.

7. The method of claim 6, wherein the threshold value is a zero count for the third counter.

8. The method of claim 1 further comprising:
adding a value of the first counter to a value of the second counter when merging the first counter and the second counter in absence of the triggering event to increment the first counter or the second counter;
adding the value of the first counter to the value of the second counter plus one when merging the first counter and the second counter and in response to the triggering event to increment the first counter or the second counter; and
storing the added value in the third counter.

9. A system comprising:
a first counter configured to increment or decrement in response to a triggering event, wherein the first counter is configured to a first size and allows overflow;
a second counter configured to increment or decrement in response to a triggering event; and
a processor configured to:
detect an overflow triggering event for the first counter;
merge the first counter and the second counter to form a third counter in response to detecting the overflow triggering event; and
set a value of a merge bit indicative of whether the first counter and the second counter are merged in response to merging the first counter and the second counter,
wherein prior to detecting the overflow triggering event causing the first counter to merge with the second counter, the increment or decrement of the first counter occurs independent of the increment or decrement of the second counter.

10. The system of claim 9, wherein the second counter is configured to a second size and allows overflow.

11. The system of claim 9, wherein the overflow triggering event is when the first counter reaches an overflow threshold value.

12. The system of claim 9, wherein the overflow threshold value is when the first counter reaches a maximum value for a size of the first counter.

13. The system of claim 9, wherein a size of the first counter is a same as a size of the second counter.

14. The system of claim 9, wherein a size of the first counter is different from a size of the second counter.

15. The system of claim 9, wherein the first counter is within a snoop filter of the processor, and wherein the first counter is controlled by a first core, and wherein the second counter is within another snoop filter and wherein the second counter is controlled by a second core.

16. The system of claim 15, wherein the cache coherency controller is configured to maintain cache coherency between the first core and the second core.

17. The system of claim 9, wherein the first and the second counters are within a snoop filter of the processor and wherein the first counter is controlled by a first core and the second counter is controlled by a second core.

18. The system of claim 17, wherein the cache coherency controller is configured to maintain cache coherency between the first core and the second core.

19. The system of claim 9, wherein the first counter is controlled by a first core and the second counter is controlled by a second core, and wherein the third counter once formed is controlled by the first core and the second core.

20. The system of claim 19, wherein the third counter is demerged to form the first and the second counters and wherein the merge bit changes value, wherein the demerge occurs in response to the third counter being decremented to a threshold value.

21. The system of claim 19, wherein the threshold value is a zero count for the third counter.

22. The system of claim 9, wherein a value of the third counter is a sum of a value of the first counter and a value of the second counter when the first counter and the second counter are merged, and wherein a value of the third counter is a sum of the value of the first counter and the value of the second counter plus one when the first counter and the second counter are merged and if the triggering event indicates that the first counter or the second counter is to be incremented.

* * * * *